(12) United States Patent
Ishida

(10) Patent No.: US 6,514,080 B2
(45) Date of Patent: Feb. 4, 2003

(54) SCUBA DIVING GUIDANCE ORGANIZATION OPERATION SYSTEM USING INFORMATION SYSTEM

(76) Inventor: Akira Ishida, 25-4, Yabe 3-Chome, Sagamihara-Shi, Kanagawa (JP)

( * ) Notice: Subject to any disclaimer, the term of this patent is extended or adjusted under 35 U.S.C. 154(b) by 0 days.

(21) Appl. No.: 09/862,117

(22) Filed: May 21, 2001

(65) Prior Publication Data

US 2002/0106618 A1 Aug. 8, 2002

(30) Foreign Application Priority Data

Feb. 8, 2001 (JP) ........................................ 2001/031728

(51) Int. Cl.⁷ .............................................. G06F 19/00
(52) U.S. Cl. ..................................................... 434/247
(58) Field of Search ................................ 434/247, 254, 434/262, 365, 367, 433

(56) References Cited

U.S. PATENT DOCUMENTS

| 6,394,341 B1 | * | 5/2002 | Makipaa et al. ............ 235/379 |
| 2002/0057284 A1 | * | 5/2002 | Dalby et al. ................. 345/700 |
| 2002/0059376 A1 | * | 5/2002 | Schwartz .................... 709/204 |
| 2002/0087496 A1 | * | 7/2002 | Stirpe et al. .................. 706/45 |

FOREIGN PATENT DOCUMENTS

| JP | 8-320645 A | * 12/1996 | ............ G09B/9/00 |
| JP | 2001-338209 A | * 12/2001 | ........... G06F/13/00 |
| JP | 2001-344433 A | * 12/2001 | ........... G06F/17/60 |

* cited by examiner

Primary Examiner—Hieu T. Vo
(74) Attorney, Agent, or Firm—Ladas & Parry

(57) ABSTRACT

There is provided a scuba diving guidance organization operation system using an information system in which in training of a diver, a subject course is given while a bidirectional communication system such as a portable equipment or a web server is used, diving skills of members are collectively managed, and training is carried out, and further, estimation of an instructor member and an exhibition of service performed by the member in connection with that can be made. In the scuba diving guidance organization operation system, an instructor estimation system and a service introduction system are connected with an instructor member of scuba diving and a member through the information system, the instructor member registers service content with the instructor estimation system and the service introduction system, and the instructor estimation system and the service introduction system provides a display of service and estimation of the instructor to the member.

9 Claims, 19 Drawing Sheets

CONTROL OF BOUYANCY

NECESSITY

PRACTICE OF TAKING NEUTRAL
BOUYANCY (FIN PIVOT)

DIVING CAN BE EASILY MADE

ONE OF PLEASURES OF DIVING

TRIMMING OF LUNG IS MAIN

BC SUPPORTS TRIMMING OF LUNG

PROCEDURE

1. AIR IS COMPLETELY EXHAUSTED FROM BC, AND LIE PRONE ON WATER BOTTOM

2. TAKE A DEEP BREATH, WAIT A MINUTE, AND CONFIRM STATE OF FLOATING UP

3. IF NOT FLOATING UP, AIR IS ONCE SLIGHTLY PUT IN BC

4. TAKE A DEEP BREATH, WAIT A MINUTE, AND CONFIRM STATE OF FLOATING UP

5. STEPS 3 AND 4 ARE REPEATED AND CONTINUED UNTIL FLOATING UP

6. CONFIRM TRIMMING OF LUNG IN WHICH UPPER BODY FLOWS UP AND GOES DOWN WITH FIN TIP AS FULCRUM

FIG. 5

SKILL CHECK

WHAT IS NECESSITY OF CONTROL
OF BOUYANCY?

TRANS-
MISSION

FIG. 6

| DATE | PLACE | INSTRUCTOR IN CHARGE | FEE | CONTENT |
|---|---|---|---|---|
| 7/14 SATURDAY | OOSEZAKI | AKIO KITAZAWA | 15000 YEN | FUN DIVING |
| 7/14 SATURDAY | IOP | AKIRA IKEZAKI | 15000 YEN | COURSE (OW) |
| 7/14 SATURDAY | TAGO | TADASI SUZUKI | 15000 YEN | COURSE (OW) |
| 7/14 SATURDAY | KUMOMI | AKIRA IKEZAKI | 15000 YEN | COURSE (OW) |
| 7/14 SATURDAY | IOP | KOUHEI NAITO | 15000 YEN | COURSE (OW) |
| 7/14 SATURDAY | IOP | MICHITAKA AZUMA | 15000 YEN | COURSE (OW) |
| 7/14 SATURDAY | IOP | AKIRA IKEZAKI | 15000 YEN | COURSE (OW) |
| 7/15 SUNDAY | IOP | AKIRA IKEZAKI | 15000 YEN | COURSE (OW) |
| 7/15 SUNDAY | IOP | RYOUHEI KOUNOIKE | 15000 YEN | COURSE (OW) |
| 7/15 SUNDAY | IOP | AKIRA IKEZAKI | 15000 YEN | COURSE (OW) |
| 7/15 SUNDAY | IOP | AKIRA IKEZAKI | 15000 YEN | COURSE (OW) |
| 7/15 SUNDAY | IOP | AKIRA IKEZAKI | 15000 YEN | COURSE (OW) |

FIG. 8

AKIRA IKEZAKI

NUMBER OF COURSES HELD THIS YEAR: 20
NUMBER OF LEADING TIMES HELD THIS YEAR: 50
INSTRUCTOR LEVEL:
MASTER INSTRUCTOR
DEEP SPECIALTY INSTRUCTOR
MDFA TRAINER

ESTIMATION OF MEMBER

SAFETY MANAGEMENT CAPABILITY

ESTIMATION A  20 TIMES

ESTIMATION B  35 TIMES

ESTIMATION C  50 TIMES

ESTIMATION D  45 TIMES

RESPONSE TO QUESTION

ESTIMATION A  20 TIMES

ESTIMATION B  35 TIMES

ESTIMATION C  50 TIMES

ESTIMATION D  45 TIMES

FIG. 9

VENUE: TAGO

PERSON IN CHARGE: AKIRA IKEZAKI

FEE: 15000 YEN

SERVICE PROVISION CONTENT

OW COURSE

ADV COURSE

BOAT SPECIALTY

FUN DIVING (2 BOATS)

BRIEF APPEAL

PLEASE APPLY FOR COURSE READILY

FIG. 10

NISHIIZU EKUMOMI
PRESENT STATE OF THE SEA (RENEWED ON JULY 10)

SOME WAVES
   NO CURRENT
   STATE OF THE SEA IS GOOD
   BEGINNER CAN ALSO DIVE
   TRANSPARENCY: 15 m
   PENETRATION DEGREE: 15 m
   WATER TEMPERATURE: 20°C (SEE SURFACE)
                      19°C (-10 m)
   AIR TEMPURATURE    21°C

INTRODUCTION OF POINT

GYUUCHAKUIWA FOR BEGINNER.
   YOU CAN ENJOY STONEFISH,
   WANDERING FISH, ETC.

OKINONE FOR ADVANCED PERSON.
   YOU CAN ENJOY DYNAMIC SCENE
   INCLUDING A LOT OF WANDERING FISH

FIG. 11

SERVICE ESTIMATION FORM

NUMBER OF PRESENT EXPERIENCES

INSTRUCTOR
IN CHARGE

INQUIRY AS TO THIS DIVING

- DID YOU THINK THAT YOU COULD DIVE SAFELY?

A) EXACTLY

B) A LITTLE

C) NOT VERY

D) NEVER

- DID YOU RECEIVE SUITABLE INFORMATION
  BEFORE START OF DIVING?

A) EXACTLY

B) A LITTLE

SCUBA DIVING GUIDANCE ORGANIZATION OPERATION SYSTEM USING INFORMATION SYSTEM

BACKGROUND OF THE INVENTION

1. Field of the Invention

The present invention relates to a scuba diving guidance organization operation system using an information system such as the Internet, and particularly to a scuba diving guidance organization operation system using an information system in which in training of a diver, a subject course is given while a bidirectional communication system such as a portable equipment or a web server is used, diving skills of members are collectively managed, and training is carried out, and further, estimation of an instructor member and exhibition of service performed by the member in connection with that can be made.

2. Description of the Related Art

Since scuba diving is a highly dangerous recreation different from skiing, tennis, golf or the like, a unique estimation standard called a C-card is used. Although this C-card merely means a certificate of estimation of skills and subjects, since there is no other effective approved qualification with respect to leisure diving, it is treated as if it is a license, and there are many cases where service can not be received if this C-card is not shown (however, there is no legal binding authority).

Under the business circle circumstances like this, it is necessary for a person, who tries to start on diving, to take a course given by a qualified person (instructor). Thus, although there is no legal binding authority, a person trying to start on diving is always required to be approved by a guidance organization. Scuba diving is greatly different from other sports and recreations in this necessity. In other sports, there is little necessity of belonging to or registering with a certain organization.

Here, in the field of scuba diving, at present, there is no organization which provides courses (either a subject course or a practical skill course) through a bidirectional communication equipment such as a web server of the Internet or a portable equipment. Further, conventionally, member service is not actually provided for a diver except for a professional level diver such as an instructor or a dive master. Further, the skill level of a leisure level diver (indicating a diver except for a professional level diver, and hereinafter referred to as a "leisure diver") has not been conventionally managed by a guidance organization through a method other than the card rank. Thus, many divers can not grasp their own acquired levels and are embarrassed.

SUMMARY OF THE INVENTION

The present invention has been made in view of the above circumstances, and an object of the present invention is to provide a scuba diving guidance organization operation system matching an information oriented society, and particularly to provide a scuba diving guidance organization operation system using an information system in which in training of a diver, a subject course is given while a bidirectional communication system such as a portable equipment or a web server is used, diving skills of members are collectively managed, and training is carried out, and further, estimation of an instructor member and exhibition of service performed by the member in connection with that can be made.

The present invention relates to a scuba diving guidance organization operation system using an information system such as the Internet, and the object of the present invention is achieved in such a manner that an instructor estimation system and a service introduction system are connected with an instructor member of scuba diving and a member through an information system, the instructor member registers service content with the instructor estimation system and the service introduction system, and the instructor estimation system and the service introduction system provides a display of service and estimation of the instructor to the member.

Besides, the present invention relates to a scuba diving guidance organization operation system using an information system such as the Internet, and the object of the present invention is achieved in such a manner that a skill up system, an instructor estimation system, and a service introduction system are connected with an instructor member of scuba diving and a member through an information system, the instructor member registers service content with the instructor estimation system and the service introduction system, the member uses the skill up system to take a subject course and a skill course, and the member gives estimation of the instructor to the instructor estimation system.

BRIEF DESCRIPTION OF THE DRAWINGS

In the accompanying drawings:

FIG. 5 is a view showing learning content corresponding to the level of a participant;

FIG. 6 is a view showing repetition of a test;

FIG. 8 is a view for explaining an operation of the instructor estimation system.

FIG. 9 is a view for explaining the operation of the instructor estimation system;

FIG. 10 is a view for explaining the operation of the instructor estimation system;

FIG. 11 is a view for explaining the operation of the instructor estimation system;

FIG. 12 is a view for explaining the operation of the instructor estimation system;

DETAILED DESCRIPTION OF THE PREFERRED EMBODIMENTS

A scuba diving guidance organization operation system of the present invention is constituted by an instructor estimation system, a service introduction system, a member management system, and a skill up system. The skill up system and the member management system recognize a member in scuba diving, and give a subject course. A person (hereinafter referred to as a member) applying to this system can easily take subject courses coincident with various diver approval standards by using a web server of the Internet or a portable equipment such as a portable telephone having an i-mode function. A subject course carried out at present is divided into several to several tens parts, and must be taken in a restricted time and only at an appointed place. This system gets rid of such restriction and troublesome, and greatly helps a beginner trying to start on scuba diving or a person trying to improve the skill of scuba diving. By using the bidirectional communication equipment such as the portable equipment or web server, it is possible to learn and improve the skill and subject knowledge in a free time, at a free frequency, and at a free pace.

The instructor estimation system and the service introduction system of the present invention are systems which introduce service carried out by a registered member (instructor member) having a qualification of an instructor for a member and show estimation of the instructor member made by a member. Although there are many services for showing service of an instructor, there is conventionally no system in which estimation of an instructor made by an end user is shown at the same time to facilitate selection of the service. The instructor is estimated with respect to the service content, fee, and the like, and the end user can select better service.

The instructor estimation system and the service introduction system are connected with the member management system and the skill up system, and information of skill levels of the members and the instructor members are made record sheets and are collectively managed. By this, delicate suitable skill guidance and service can be provided to the members and the instructor members. In addition, since skill information of the members and the instructor members, and various information relating to diving can be integrated, the efficiency of information can be raised.

Figure 1:
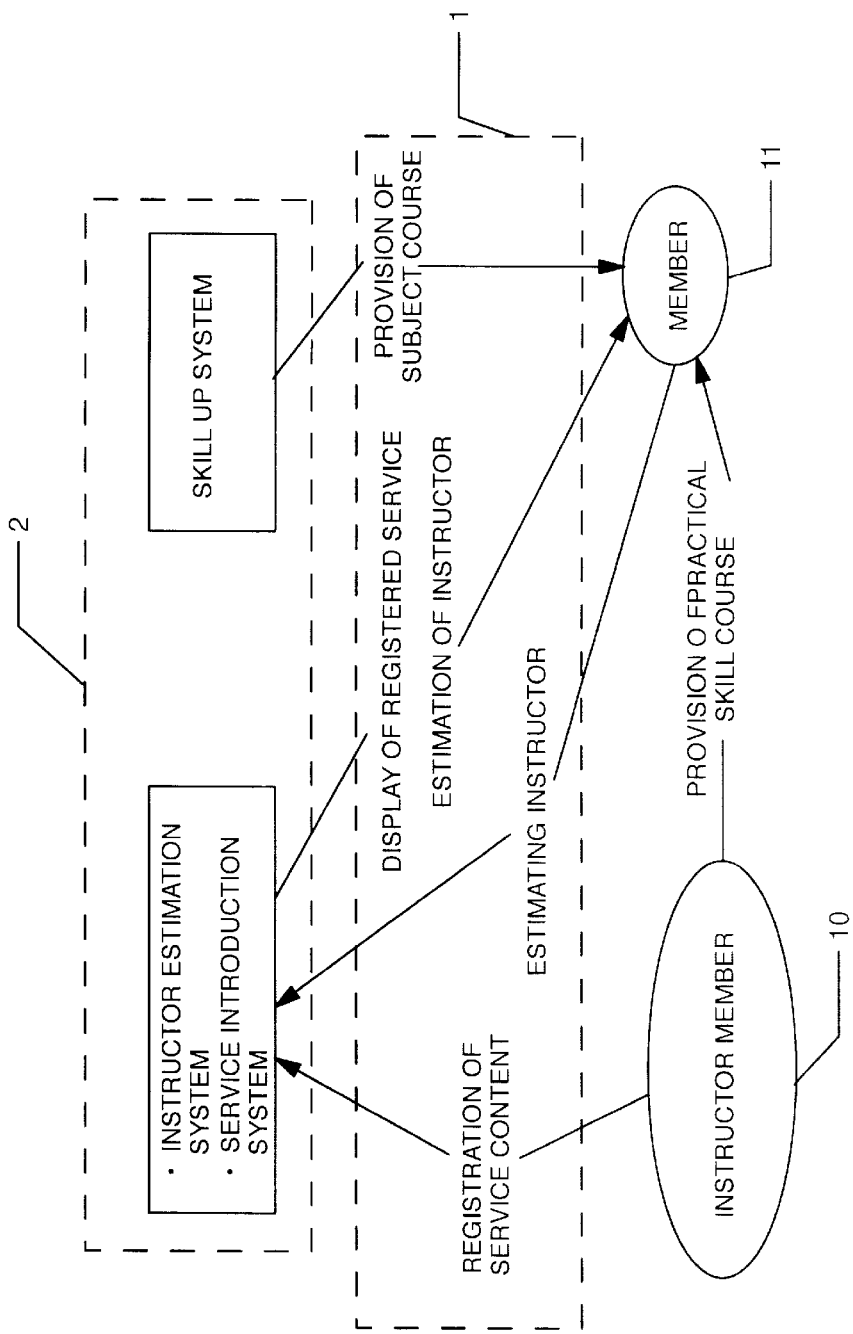
FIG. 1 is a view showing the outline of the present invention.

FIG. 1 shows the outline of the present invention. An instructor member 10 (personal computer terminal) registers service content with an instructor estimation system and a service introduction system in a web server 2 through an Internet 1 (or a portable/mobile equipment), and provides a practical skill course to a beginner trying to learn scuba diving or a member 11 trying to improve the level. The member 11 notifies the instructor estimation system and the service introduction system of the estimation of the instructor with respect to the practical skill course through the Internet 1 or the portable equipment. The instructor estimation system and the service introduction system notify the member of the registered service and the estimation of the instructor member 10 through the Internet 1 or the portable equipment, and the skill up system provides a subject course to the member 11. Portions of dotted lines of FIG. 1 indicate Internet communication.

The instructor estimation system, the service introduction system, and the skill up system constitute the web server 2, and the web server 2 further includes a member management system for managing the instructor member and the member.

Figure 2:
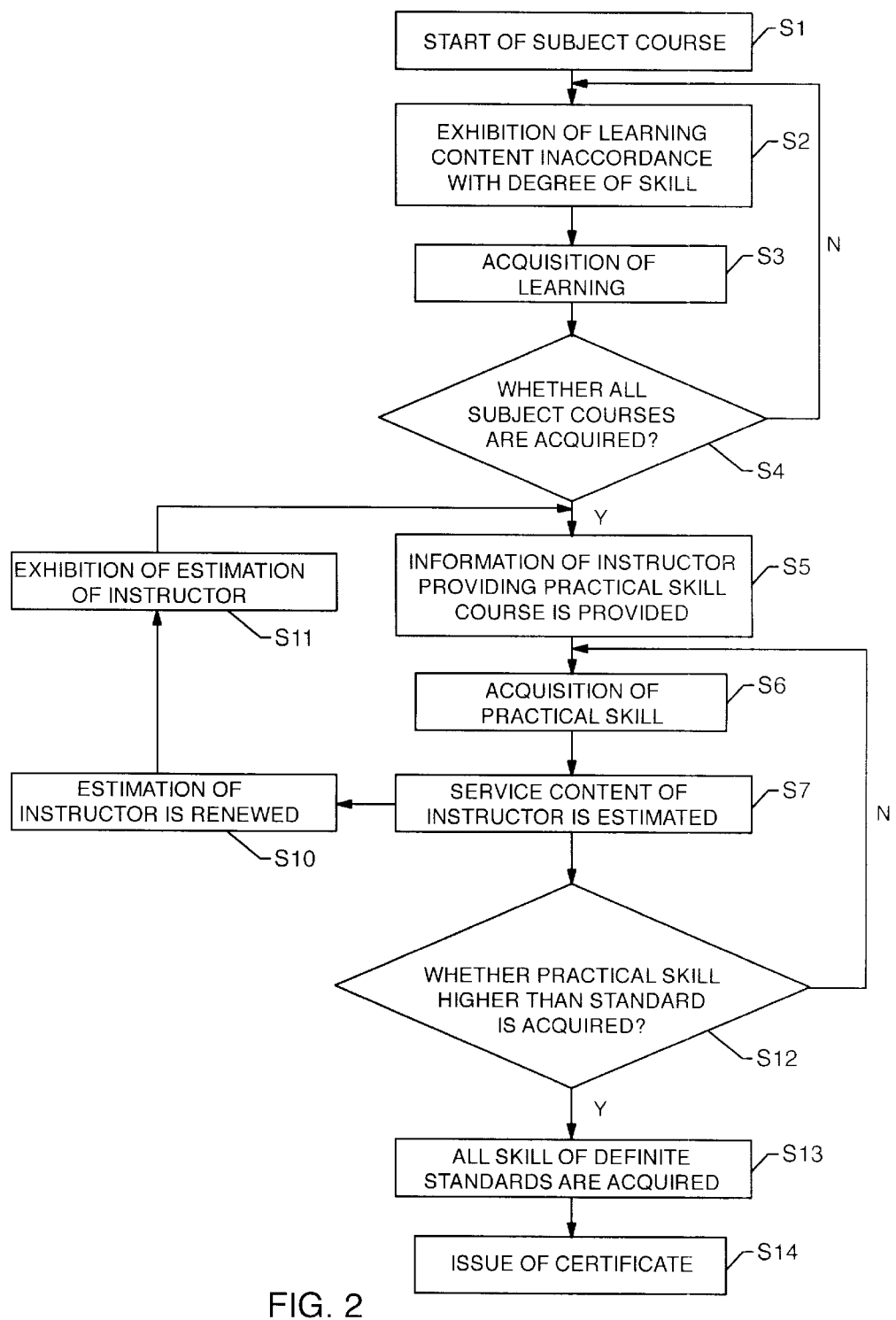
FIG. 2 is a flowchart showing an example of the whole operation of the present invention.

FIG. 2 shows an example of the whole operation of the present invention. A member trying to start on scuba diving first takes a subject course through the skill up system (Step S1), and acquires knowledge while learning content corresponding to the degree of skill is exhibited (Steps S2, S3). The subject course is given through a bidirectional communication equipment of the Internet or the like, and the optimum content is exhibited in accordance with the level of each person, and when the member has understood the content, he or she notifies the skill up system that the content has been understood (Step S4).

The skill up system judges the level of the member through the noticed content from the member, and issues an instruction to proceed to a next stage if the level is sufficient, or an instruction to take the same content if not. When the learning stage reaches a certain standard, the member is regarded as having finished the stage, receives information of an instructor providing a practical skill course through the Internet (Step S5), and receives an instruction to take a practical skill course or to proceed to learning of a next stage (Step S6). The member estimates the service content of the instructor giving the practical skill course (Step S7), renews the estimation of the instructor by this (Step S10), exhibits the estimation of the instructor (Step S11), and information of the instructor is provided by using this exhibited estimation (Step S5). By this, the actual estimation obtained through the execution of the practical skill course is given to the instructor, and more accurate information can be provided to the member.

After the member estimates the service content of the instructor as described above, it is judged whether or not a practical skill higher than a standard is acquired (Step S12), and in the case where it is acquired, a certificate is issued after the member reaches the levels of definite standards as to all skills (Steps S13, S14). In the case where subjects and practical skills of definite standards as to all skills are not acquired, the member returns to the step S6 and repeatedly takes the practical skill course.

Figure 3:
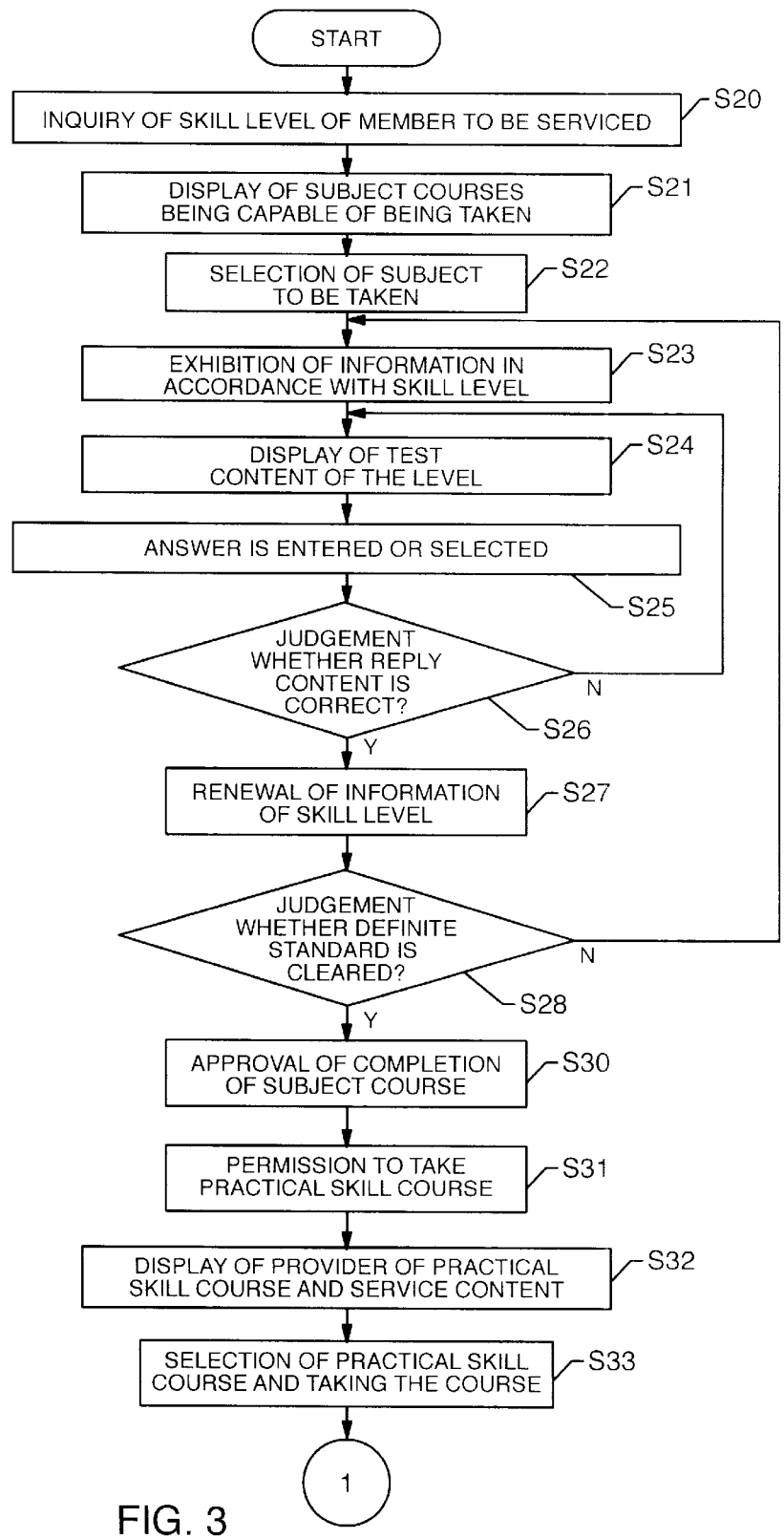
FIG. 3 is a view of a part of a flowchart showing an operation example of a step up system.
Figure 4:
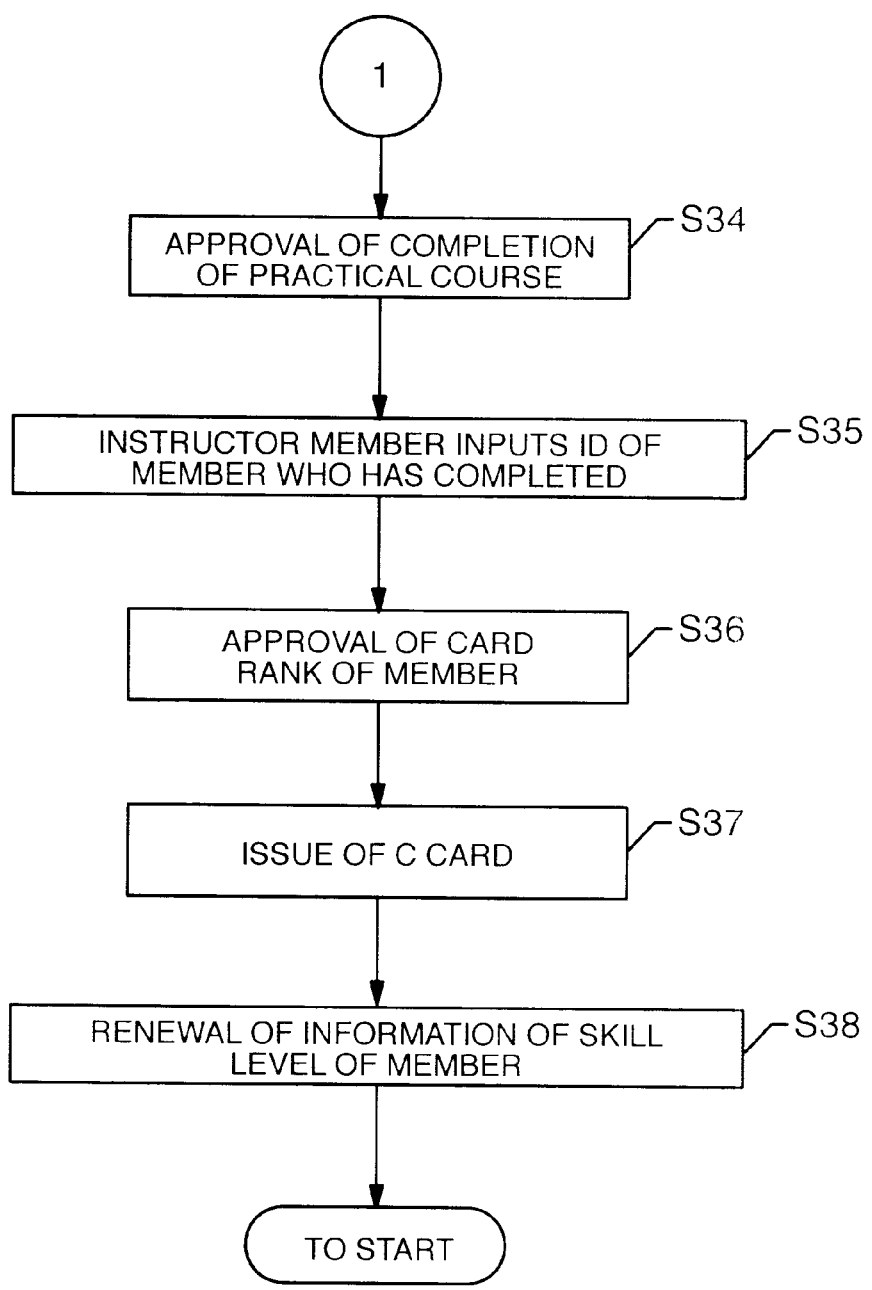
FIG. 4 is a view of a part of the flowchart showing the operation example of the step up system.

Next, a judgment method of a subject course and a practical skill course will be described in detail with reference to FIGS. 3 and 4.

First, the skill level of a member to be provided with service is checked in the skill up system (Step S20), and the skill up system exhibits information of subject courses to be taken in accordance with the skill level (Step S21). An exhibiting method uses a web server, a display to a portable equipment, mail or the like, and contents, for example, as shown in FIG. 5 are exhibited. The member selects a subject from the displayed contents (Step S22). Based on this, the skill up system exhibits information corresponding to the skill level (Step S23), and displays the test content of the level (Step S24). The member enters or selects an answer to the test content (Step S25), and inquires of the skill up system if a question or the like occurs. The method is form entry, mail or the like, and the web or the portable equipment is used.

A display of test content and an answer like this is repeated, a judgement of a correct answer in reply content is made (Step S26), information of the skill level of the member is renewed in the case of a correct answer (Step S27), and it is judged whether or not the learning content reaches a definite standard (Step S28). FIG. 6 shows the state where the skill is acquired by repetition of tests. In the case where the learning content does not reach the definite standard, the procedure returns to the step S23 exhibiting the information corresponding to the skill level. As a result of judgement, in the case where the learning content reaches the definite standard, the member is regarded as having acquired the subject of the skill level, and the approval of completion of the subject course is made (Step S30).

Thereafter, the skill up system permits participation in a practical skill course (Step S31), and carries out a display of a person providing the practical skill course and service content to the web (Step S32). On the other hand, the member selects a practical skill course, and applies for participation in the course (Step S33). The practical skill course is actually given by the instructor member in a pool, the sea, a lake or the like. As to the practical skill, detailed lecture content is introduced in the subject course. The practical skill courses are provided in the service introduction system of the instructor, and selection can be made among them. In the case where the practical skill course is acquired, the instructor having given the course petitions the system. In the case where the skill level reaches a definite standard, the approval of completion of the practical skill course is made (Step S34), the instructor member inputs the ID of the member having completed the course (Step S35), and the card rank of the member is approved (Step S36). Then, the C card equivalent to a license is issued (Step S37), the information of the skill level of the member is renewed (Step S38), and the procedure returns to the first step.

Figure 7:
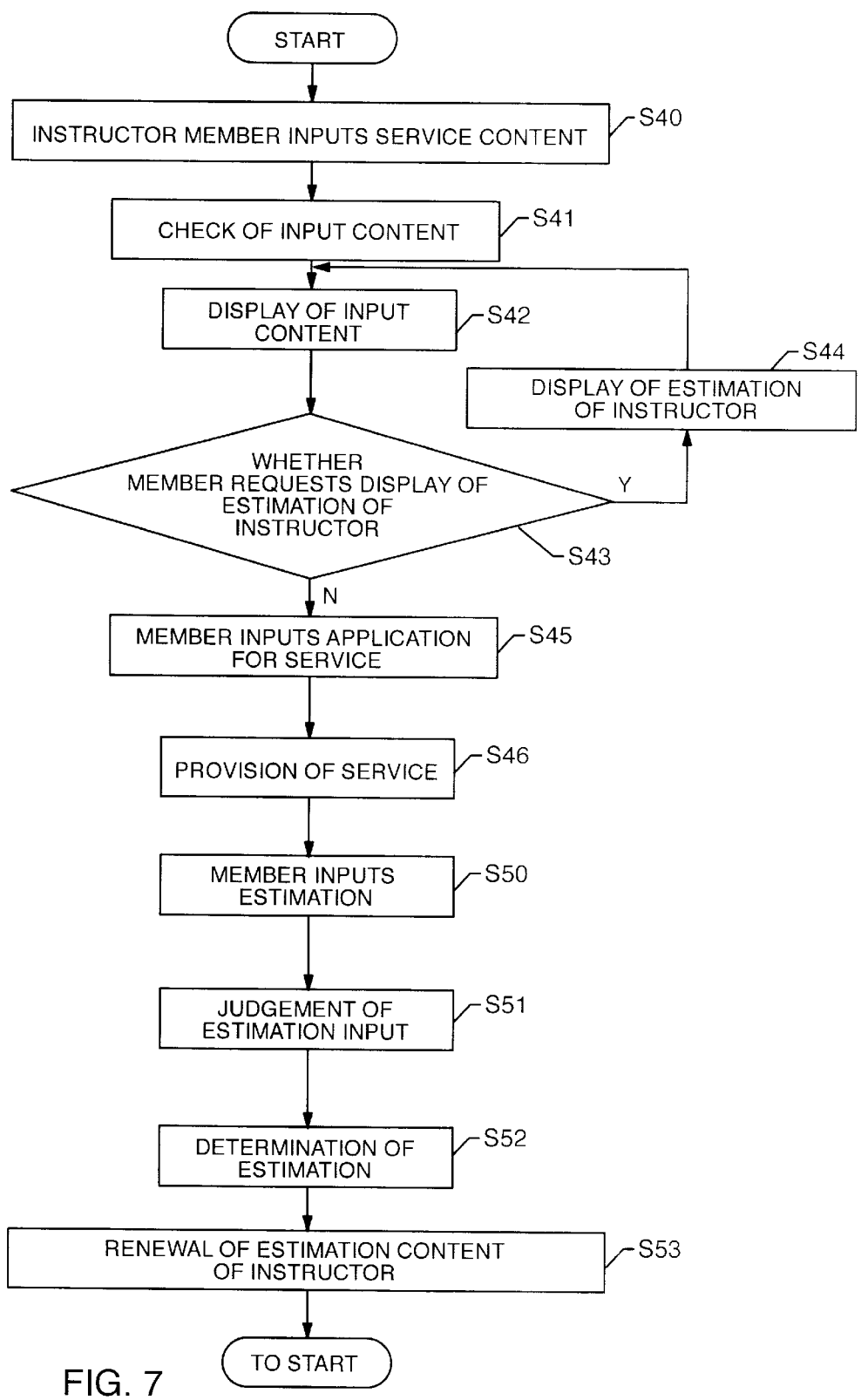
FIG. 7 is a flowchart showing an operation example of an instructor estimation system.

Next, an evaluation procedure of an instructor will be described with reference to a flowchart of FIG. 7.

A member of a leisure diver receives service by an instructor member, and the member estimates the content of the service. As the estimation method, estimation standards are exhibited from the guidance organization. The member transmits the estimation based on the estimation standards to the guidance organization through the web, the portable equipment or the like, and transmits the diving experience of the member himself to the guidance organization. The transmission medium is form entry on the web, mail or the like. That is, instructor members input service contents (Step S40), the input contents are checked (Step S41), and the list of the service provided by the instructors as shown in FIG. 8 is displayed (Step S42). If the name of an instructor in charge is clicked, the content as shown in FIG. 9 is displayed through a hyperlink. When an item of the content is clicked, detailed information as shown in FIG. 10 is provided, and further, when an item of a venue is clicked, the present information as shown in FIG. 11 is provided.

To the display of the input content like this, when the member requests a display of estimation of an instructor member (Step S43), the display of the estimation of the instructor member is carried out, and the procedure returns to the step S42 (Step S44). In the case where the member does not request the display of estimation of an instructor member, the member inputs application for the service (Step S45), and receives the service (Step S46). Estimation input from the member is performed (Step S50), judgement of the estimation input is performed (Step S51), determination of estimation is performed (Step S52), and estimation content of the instructor member is renewed (Step S53).

The estimation is performed in the form as shown in FIG. 12. As the estimation content, with respect to "Did you safely dive?", "Was proper briefing made?", "Was a suitable diving plan offered?", "detailed content of diving", "Was a question occurring as to diving suitably answered?", and the like, estimation is made at several stages, and this is detailed as to diving. By this estimation, the instructor can easily find a remedy in improving the service content. Thus, it is expected that the service of the instructor is improved.

Figure 13:
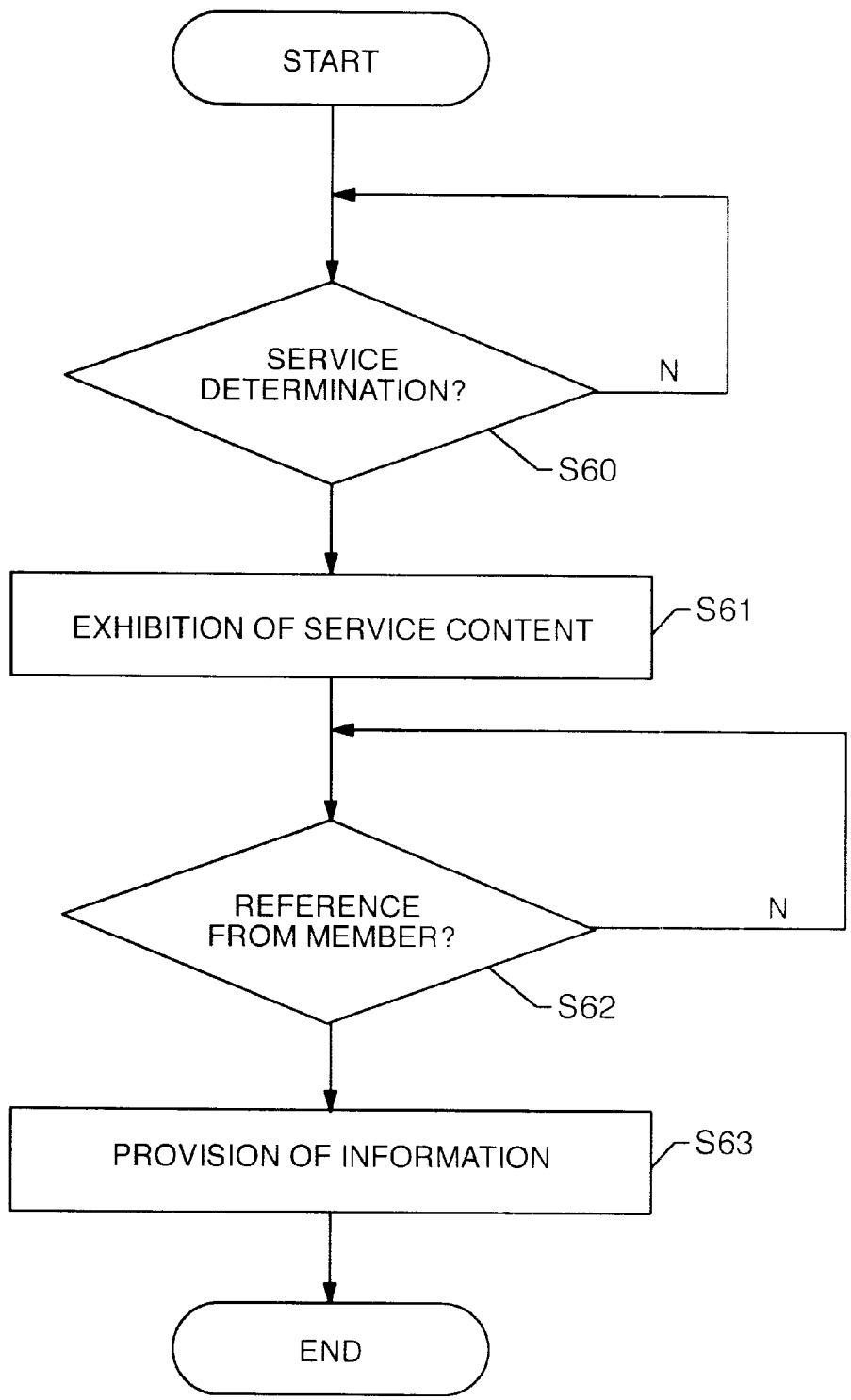
FIG. 13 is a flowchart showing an operation example of a service introduction system by an instructor.

An introduction procedure of service by an instructor member will be described with reference to a flowchart of FIG. 13. When the service conducted personally is determined (Step S60), the instructor member exhibits the service content to the guidance organization (Step S61). The exhibition of the service content is made by the internet, a portable equipment or the like (mail, form entry, etc.). The exhibited information content is the date of the service, necessary fee, a venue, service content (contents of a course, kind of diving to be led, etc.), and the like. The member can refer to the exhibited information through the internet, the portable equipment or the like (Step S62). Specifically, service introduction is expressed in a site or the like, and easy reference is made possible. Selected information or not-selected information is provided to registered members by mail distribution or the like (Step S63). The estimation of the instructor providing the service is also attached to the information to be provided. It is possible to simultaneously refer to the service to be provided and the estimation of the instructor providing the service.

Figure 14:
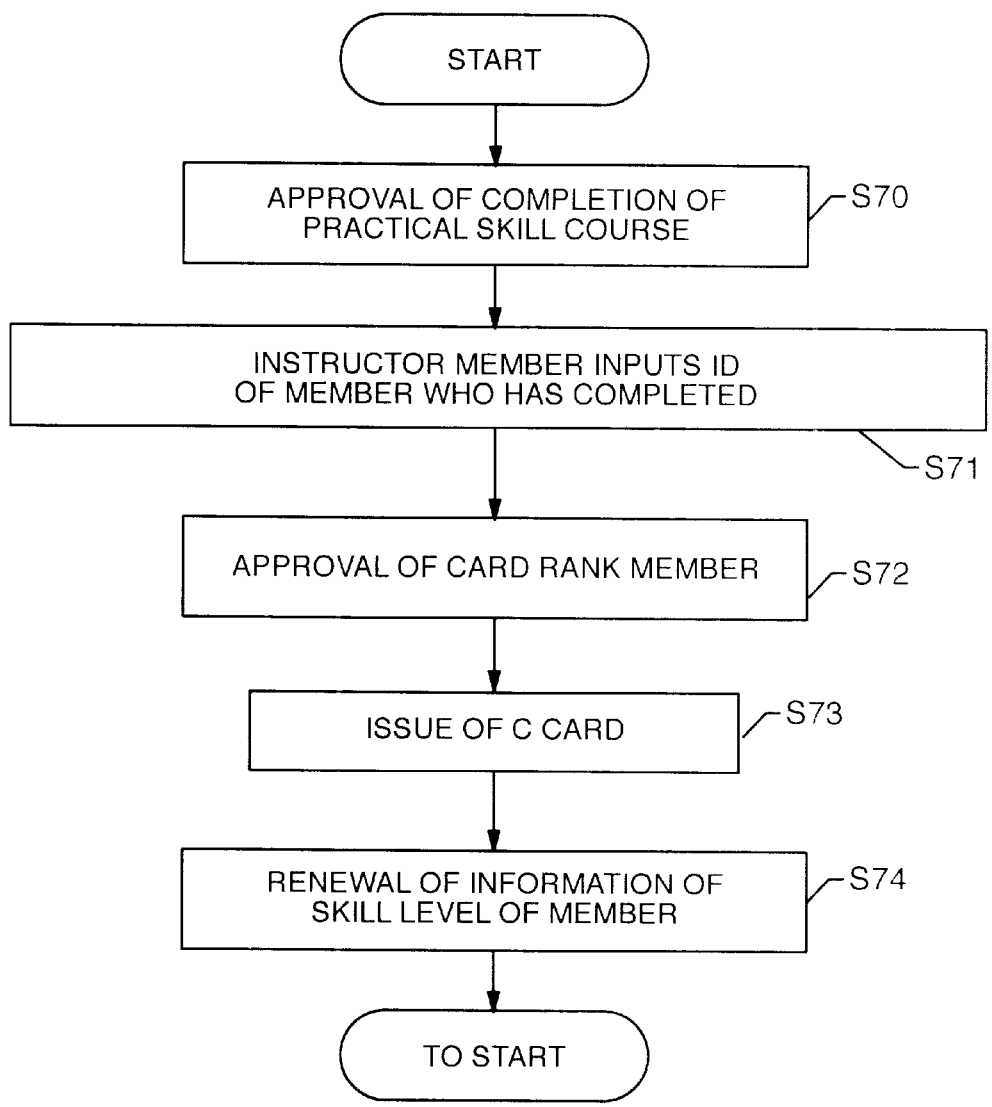
FIG. 14 is a flowchart showing an operation example of a practical skill course.

Next, the operation of a practical skill course will be described with reference to FIG. 14. After the approval of completion of the practical skill course (Step S70), the instructor member inputs the ID of the member having completed the course (Step S71), and the card rank of the member is approved (Step S72). Then, the C-card is issued (Step S73), the information of the skill level of the member is renewed (Step S74), and the procedure returns to the first step.

Next, the operation of the web server 2 will be described with reference to FIGS. 15 to 19.

First, an ID and password file is opened (Step S100), an ID and a password are inputted (Step S101), and the ID (XA) and the password (XB) are verified (Step S102, S103). In the case where the verification is right, a main menu is displayed (Step S104), and selection of an instructor introduction page (Step S105), selection of a school schedule introduction page (Step S106), selection of a tour schedule introduction page (Step S107), and selection of an instructor estimation page (Step S108) are sequentially judged. In the case where the instructor introduction page is selected, the procedure proceeds to a routine of FIG. 16, in the case where the school schedule introduction page is selected, the procedure proceeds to a routine of FIG. 17, in the case where the tour schedule introduction page is selected, the procedure proceeds to a routine of FIG. 18, and in the case where the instructor estimation page is selected, the procedure proceeds to a routine of FIG. 19.

In the case where selection of the pages is not made at all the Step S105 to Step S108, a step up data file is opened (Step S110), and a subject level of a person of an inputted ID number is read out (Step S111). COTE (x) indicates a subject level of a person having an ID number of X. Here, a display of CONTENTS (LV) is carried out (Step S112). CONTENTS (x) indicates lecture content of a subject course of a level X. Thereafter, understanding confirmation is inputted (Step S113), and a display of TEST (LV) is carried out (Step S74). TEST (x) indicates test content of the subject course of the level X. Then, an answer is inputted (Step S115), and it is judged whether or not it is correct (Step S116). In the case where it is not correct, the procedure returns to the Step S112. In the case of a correct answer, renewal is made to a next person (LV+1→LV), and the procedure returns to the Step S111. In the case where the procedure is not continued, it is ended.

On the other hand, at the Step S105, in the case where the instructor introduction page is selected, an instructor file is opened (Step S120), an active area selection screen is displayed (Step S121), and all data coincident with an active area are extracted (Step S122). A search starts from the first (n=0) of the data, the n-th coincident data is displayed (Step S124), and it is judged whether or not (n+1)th data exists (Step S125). In the case where the (n+1)th data exists, the number is renewed (n+1→n) (Step S129), and the procedure returns to the Step S124.

At the Step S125, in the case where the (n+1)th data does not exist, it is judged whether instructor selection is performed (Step S126). In the case where the instructor selection is performed, data of the selected instructor is displayed (Step S127), and in the case where the procedure is continued, it returns to the Step S121 (Step S128). In the case where the procedure is not continued, and in the case where there is no instructor selection at the Step S126, it is ended.

At the Step S106, in the case where the introduction page of school schedule is selected, a schedule input/departure place input screen is displayed (Step S160), a school data file is opened (Step S161), and data coincident with input conditions is acquired from the school data file (Step S162). Then, a search starts from the first (n=0) of the data (Step S163), n-th data is displayed (Step S164), and it is judged whether or not (n+1)th data exists (Step S165). In the case where the (n+1)th data exists, the number is renewed (n+1→n) (Step S166), and the procedure returns to the Step S164.

At the Step S165, in the case where the (n+1)th data does not exist, school data is selectively inputted (Step S170), and the details of the selected school data are displayed (Step S171). Then, it is judged whether or not data of an instructor in charge is inquired (Step S172), and in the case of inquiring, instructor data is opened (Step S173), the data of the instructor in charge is acquired (Step S174), and the data of the instructor is displayed (Step S175).

Thereafter, it is judged whether or not an application is made (Step S176), and in the case where the application is made, data rewriting of the selected school data is performed (Step S180), application content is transmitted through mail to the instructor in charge and a person in charge of the guidance organization (Step S181), and data rewriting of the member is performed (Step S182). Thereafter, it is judged whether or not the procedure is continued (Step S183), and in the case of continuation, it returns to the Step S160. In the case where it is not continued at the Step S183, and in the case where an application is not made at the Step S176, it is ended.

Further, at the Step S107, in the case where the introduction page of tour schedule is selected, a schedule input/departure place input screen is displayed (Step S130), a tour data file is opened (Step S131), and data coincident with input conditions is acquired from the tour data file (Step S132). Then, a search starts from the first (n=0) of the data (Step S133), n-th data is displayed (Step S134), and it is judged whether or not (n+1)th data exists (Step S135). In the case where the (n+1)th data exists, the number is renewed (n+1→n) (Step S136), and the procedure returns to the Step S134.

At the Step S135, in the case where the (n+1)th data does not exist, tour data is selectively inputted (Step S140), and the details of the selected tour data are displayed (Step S141). Then, it is judged whether or not data of the instructor in charge is inquired (Step S142), and in the case of inquiring, instructor data is opened (Step S143), the data of the instructor in charge is acquired (Step S144), and the data of the instructor is displayed (Step S145).

Thereafter, it is judged whether or not an application is made (Step S146), and in the case where the application is made, data rewriting of the selected tour data is made (Step S150), application content is transmitted through mail to the instructor in charge and a person in charge of the guidance organization (Step S151), and data rewriting of the member is made (Step S152). Thereafter, it is judged whether or not the procedure is continued (Step S153), and in the case of continuation, it returns to the Step S130. In the case where the procedure is not continued at the Step S153, and in the case where the application is not made at the Step S146, it is ended.

Figure 15:
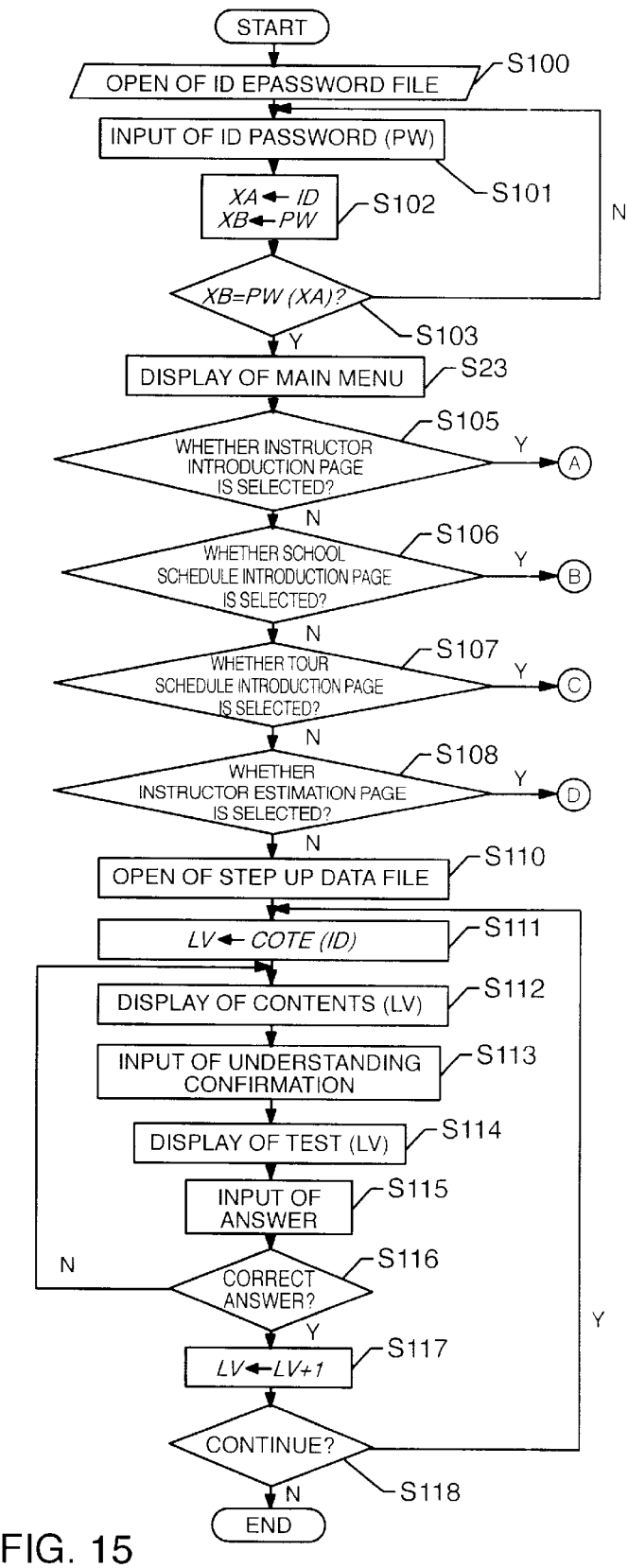
FIG. 15 is a view of a part of a flowchart showing an operation example of a web server.
Figure 16:
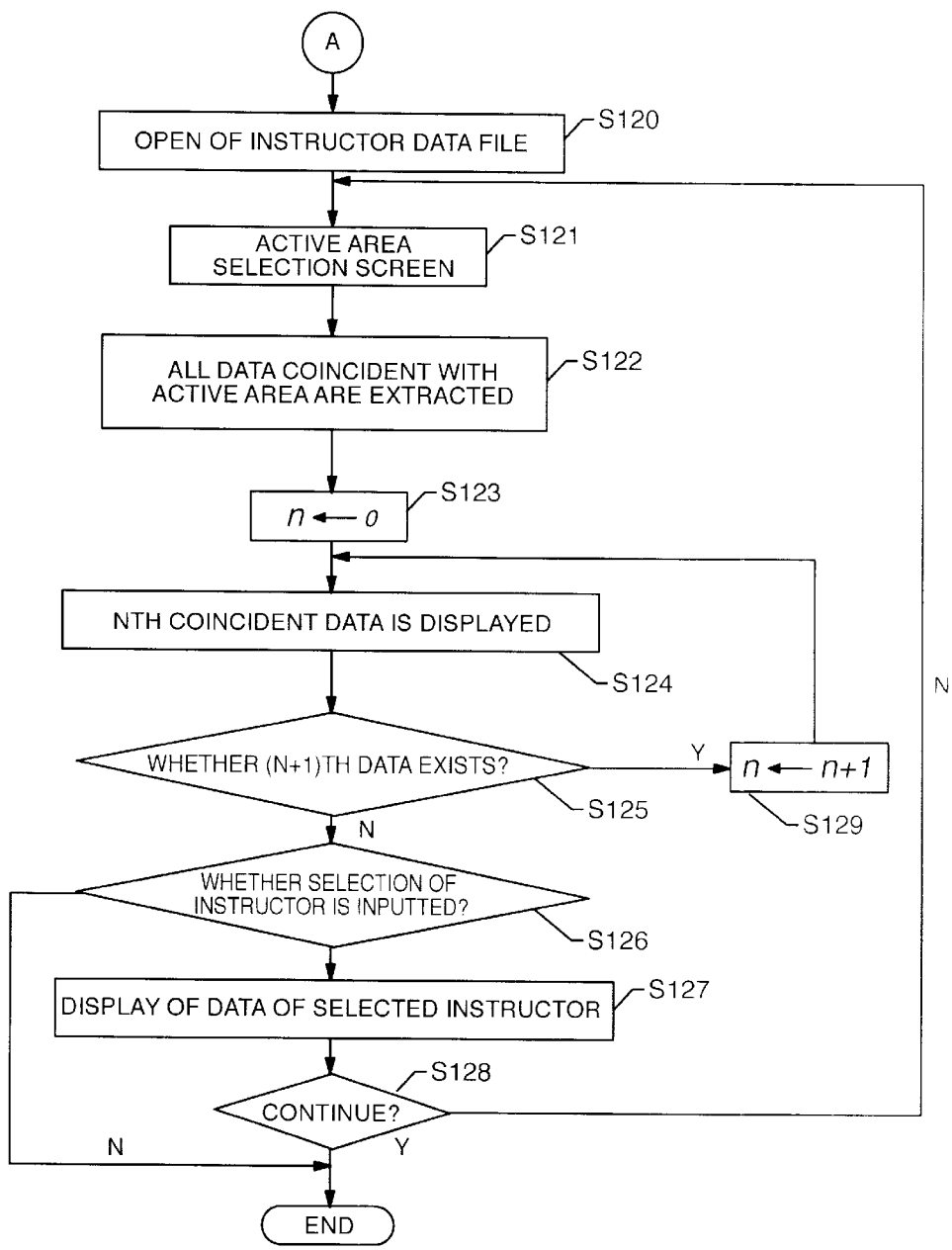
FIG. 16 is a view of a part of the flowchart showing the operation example of the web server.
Figure 17:
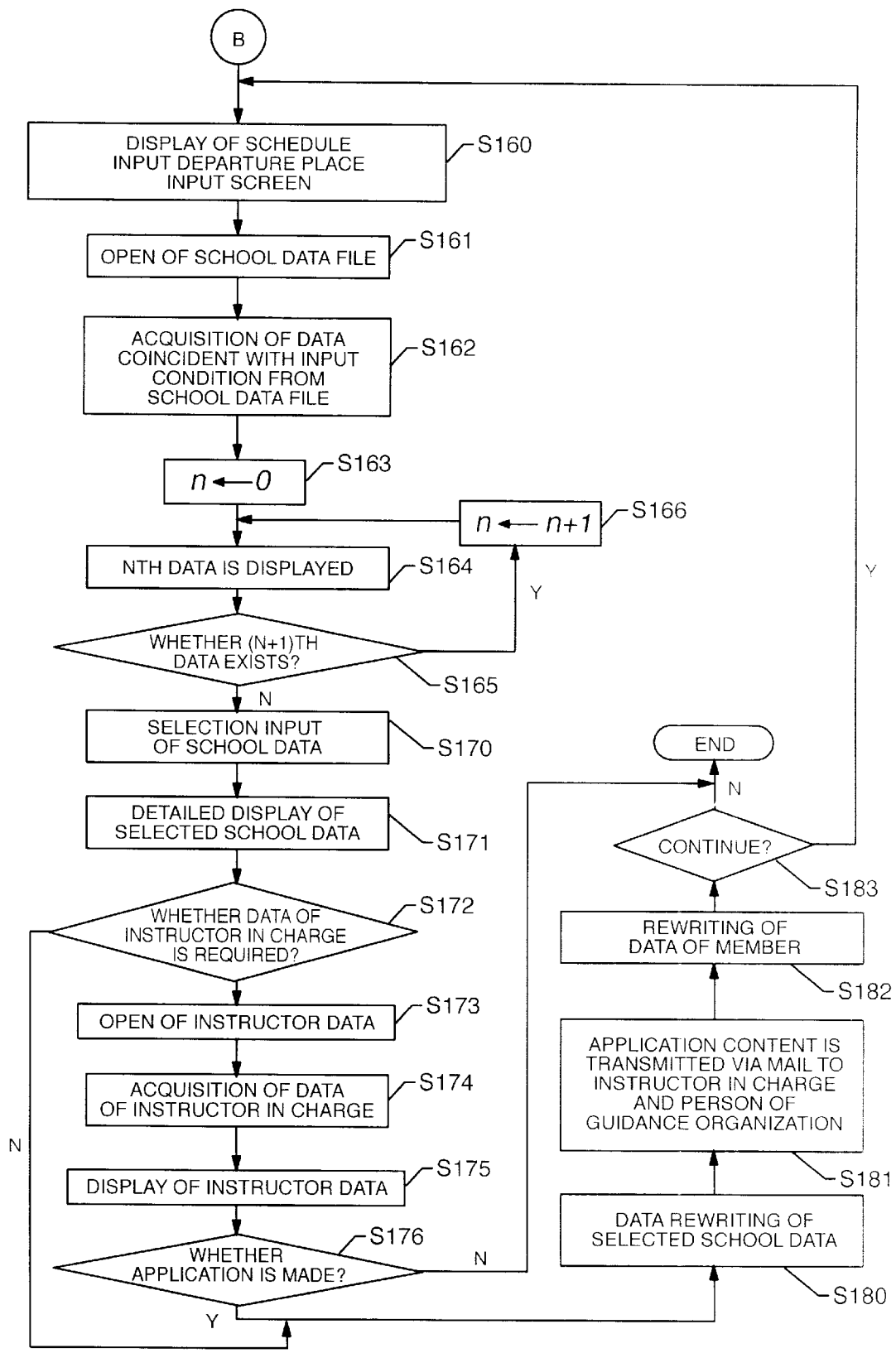
FIG. 17 is a view of a part of the flowchart showing the operation example of the web server.
Figure 18:
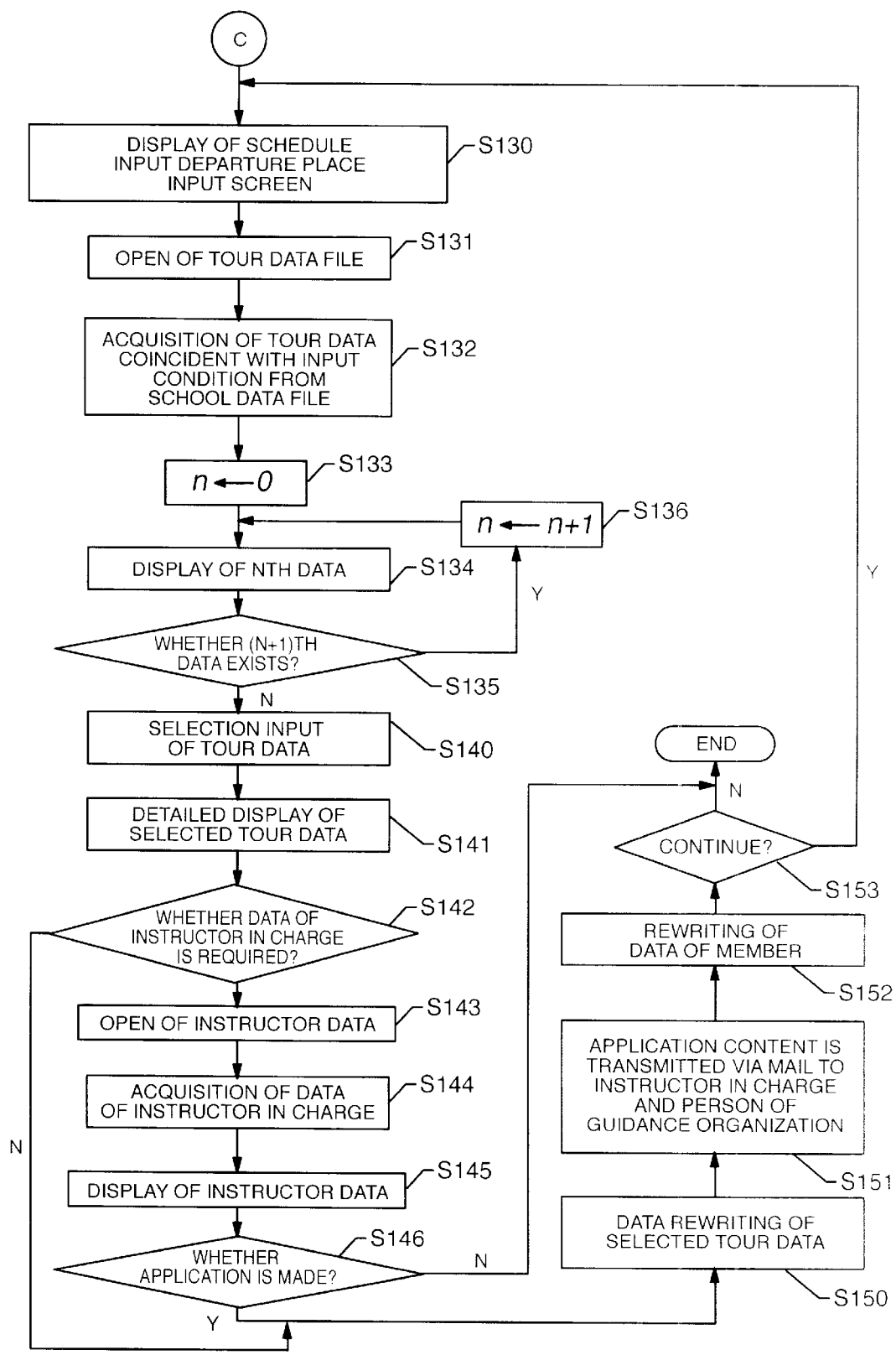
FIG. 18 is a view of a part of the flowchart showing the operation example of the web server.
Figure 19:
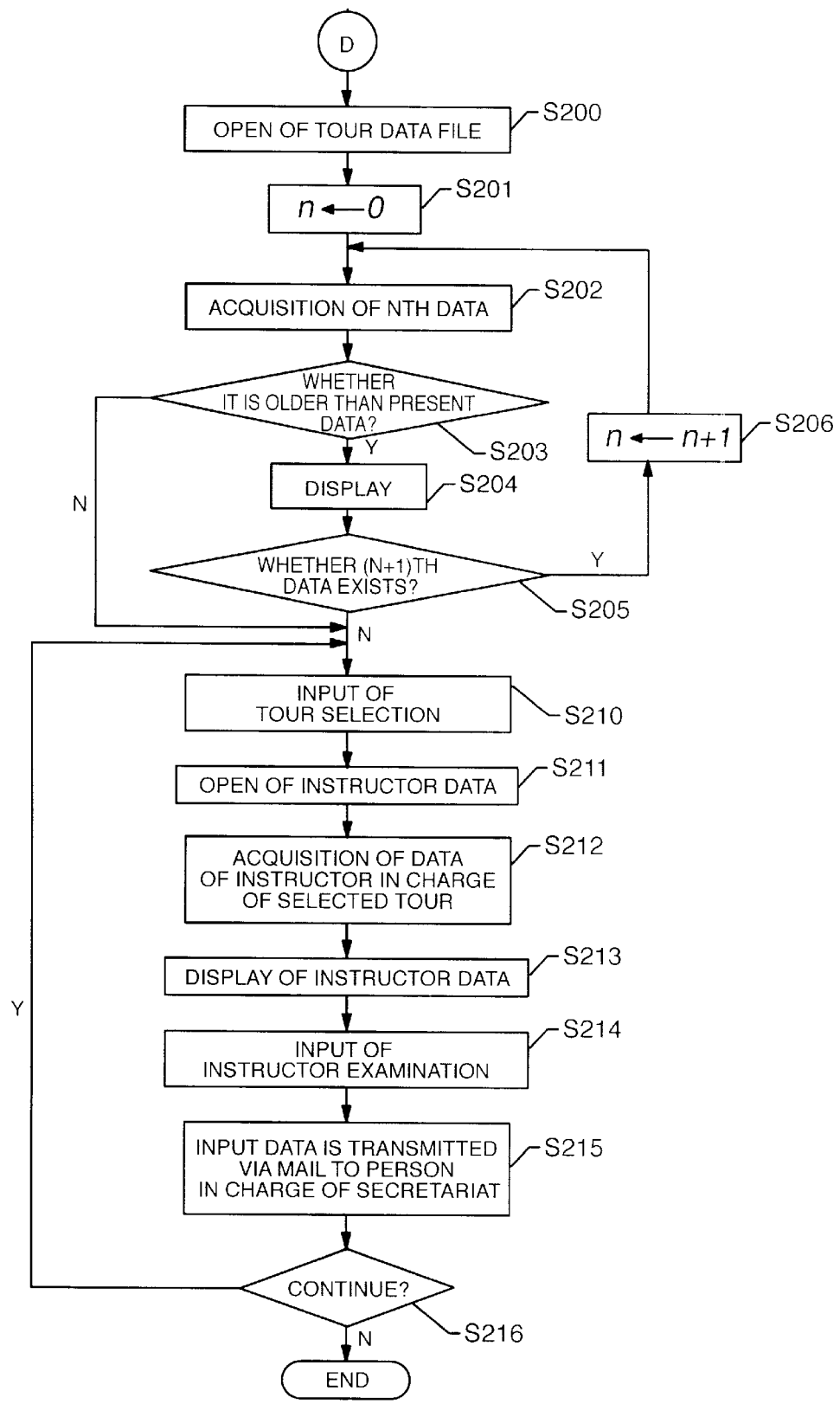
FIG. 19 is a view of a part of the flowchart showing the operation example of the web server.

At the Step S108 of FIG. 15, in the case where the instructor estimation page is selected, as shown in FIG. 19, tour data is opened (Step S200), a search starts from the first (n=0) of the data (Step S201), n-th data is acquired (Step S202), and it is judged whether or not it is older than the present date (Step S203). In the case where it is older than the present date, a display is carried out (Step S204), and it is judged whether or not (n+1)th data exists (Step S205). In the case where it exists, data renewal (n+1→n) is made, and the procedure returns to the Step S202.

At the Step S205, in the case where the (n+1)th data does not exist, selection input of a tour is made (Step S210), instructor data is opened (Step S211), and the data of the instructor in charge of the selected tour is acquired (Step S212). Then, the instructor data is displayed (Step S213), estimation of the instructor is inputted (Step S214), and the input data is transmitted via mail to a person in charge of a secretariat (Step S215). Thereafter, in the case where the procedure is continued, it returns to the Step S210, and in the case where it is not continued, it is ended.

As described above, according to the scuba diving guidance organization operation system using the information system of the present invention, a course is provided through a bidirectional communication equipment, so that guidance corresponding to each of members can be made. Besides, member service is also provided to a leisure diver, so that a skill level of each member can be grasped, and guidance of level improvement can be easily made. Thus, the improvement of the skill level of the leisure diver can be expected. Further, since a question or the like from the leisure diver is received through the web server, it becomes possible to take care of a member who is embarrassed by a question to an acquisition level.

Besides, since the skill level is improved, diving accidents are decreased, and the present invention can contribute to the scuba diving business circle and the society relating to diving. Under the present circumstances, an increase of a burden imposed on an instructor is pointed, and many people say that it causes an accident. This system lessens the burden of the instructor with respect to a course. By this, it becomes possible for the instructor to use much capability for safety management.

What is claimed is:

1. A scuba diving guidance organization operation system using an information system, wherein:
   an instructor estimation system and a service introduction system are connected with an instructor member of scuba diving and a member through the information system;
   the instructor member registers service content with the instructor estimation system and the service introduction system; and
   the instructor estimation system and the service introduction system provides a display of service and estimation of the instructor to the member.

2. A scuba diving guidance organization operation system according to claim 1, wherein the member can notify the instructor estimation system and the service introduction system of estimation of the instructor.

3. A scuba diving guidance organization operation system according to claim 1, further comprising a skill up system, wherein a subject course is provided to the member.

4. A scuba diving guidance organization operation system according to claim 3, wherein the information system is an internet, and the instructor estimation system, the service introduction system, and the skill up system are managed by a web server connected to the internet.

5. A scuba diving guidance organization operation system. according to claim 4, wherein the web server includes a member management system.

6. A scuba diving guidance organization operation system according to claim 1, wherein the information system is an internet.

7. A scuba diving guidance organization operation system using an information system, wherein:

a skill up system, an instructor estimation system, and a service introduction system are connected with an instructor member of scuba diving and a member through the information system;

the instructor member registers service content with the instructor estimation system and the service introduction system;

the member uses the skill up system to take a subject course and a skill course; and the member gives estimation of the instructor to the instructor estimation system.

8. A scuba diving guidance organization operation system according to claim 7, wherein each time a learning of the member reaches a definite level, the member proceeds to a next stage.

9. A scuba diving guidance organization operation system according to claim 8, when a level of the member reaches a definite level, the skill up system issues a certificate to the member.

* * * * *